United States Patent [19]
Hojabri

[11] Patent Number: 5,877,599
[45] Date of Patent: Mar. 2, 1999

[54] VERTICAL AND HORIZONTAL SCANNING CORRECTION SYSTEM FOR VIDEO DISPLAY

[75] Inventor: Peyman Hojabri, San Jose, Calif.

[73] Assignee: National Semiconductor Corporation, Santa Clara, Calif.

[21] Appl. No.: 731,247

[22] Filed: Oct. 11, 1996

[51] Int. Cl.$^6$ .................................................. G09G 1/04
[52] U.S. Cl. .......................................................... 315/371
[58] Field of Search .................................... 315/370, 371, 315/393; 348/806

[56] References Cited

U.S. PATENT DOCUMENTS

| | | | |
|---|---|---|---|
| 3,984,729 | 10/1976 | Steckler et al. | 315/408 |
| 4,518,898 | 5/1985 | Tarnowski et al. | 315/371 |
| 4,533,855 | 8/1985 | Willis et al. | 315/370 |
| 4,645,985 | 2/1987 | Dietz | 315/371 |
| 4,782,269 | 11/1988 | Haferl | 315/371 |
| 5,331,289 | 7/1994 | Price | 330/252 |
| 5,432,474 | 7/1995 | Lauffenburger et al. | 330/252 |

OTHER PUBLICATIONS

SGS–Thomson Microelectronics, TDA 9105, "Deflection Processor for Multisync Monitors", Oct. 1995, pp. 1/31—31/31.

*Primary Examiner*—Gregory C. Issing
*Attorney, Agent, or Firm*—Limbach & Limbach L.L.P.

[57] ABSTRACT

A vertical and horizontal scanning correction system for generating vertical and horizontal scanning correction signals for an image display device which displays therewith an image having consistent vertical and horizontal image dimensions regardless of the vertical positioning thereof includes a vertical ramp generator and scanning correction circuit and a horizontal scanning correction circuit which are both controlled by a vertical position control signal and together maintain consistent vertical and horizontal image dimensions regardless of the vertical positioning thereof. The vertical ramp generator and scanning correction circuit includes a multiplier circuit which receives, processes and multiplies a ramp signal to produce a third order current signal component representing a third order product of the voltage ramp signal as part of the vertical scanning correction signal. The horizontal scanning correction circuit includes a signal rectifier and second and fourth order signal generators which, based upon the vertical ramp and scanning correction signal, generate a rectified signal and second and fourth order signals which represent second and fourth order products of the rectified signal. The vertical ramp and scanning correction signal and second and fourth order signals are individually scaled and combined in accordance with a set of gain control signals to produce the horizontal scanning correction signal.

15 Claims, 5 Drawing Sheets

AMPLITUDE MODULATED SAWTOOTH CURRENT FOR EAST-WEST CORRECTION

A CURRENT AT FIELD FREQUENCY FOR EAST-WEST UNBALANCE CORRECTION

VERTICAL AND HORIZONTAL SCANNING CORRECTION SYSTEM FOR VIDEO DISPLAY

BACKGROUND OF THE INVENTION

1. Field of Invention

The present invention relates to vertical and horizontal scanning correction systems for video displays, and in particular, to vertical and horizontal scanning correction systems for large video displays with flat screens.

2. Description of the Related Art

As the display areas, or screens, of video displays have become larger and flatter, maintaining geometrically correct, e.g., linear, vertical and horizontal raster dimensions has become more problematic. This is particularly true for shallower cathode ray tubes (CRTs) due to the greater angles (vertical and horizontal) of deflection of the electron beams which create the raster. As is well known in the art, the reason for distortions in the larger and flatter screens is that the corners of such screens are further from the point of deflection of the electron beams as compared with the center of the screen. Thus, the electron beams are moved along greater horizontal and vertical dimensions at the extreme angles of deflection, i.e., the corners.

Figure 1A:
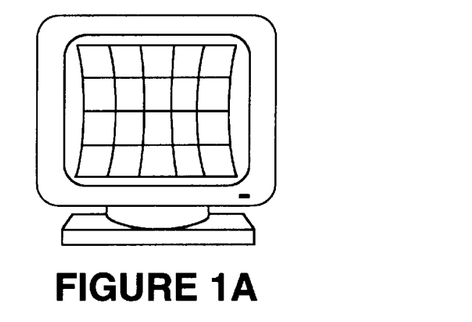
FIGS. 1A–1D illustrate CRT rasters with east-west pincushion, trapezoidal, bow and parallelogram distortions, respectively.
Figure 1B:
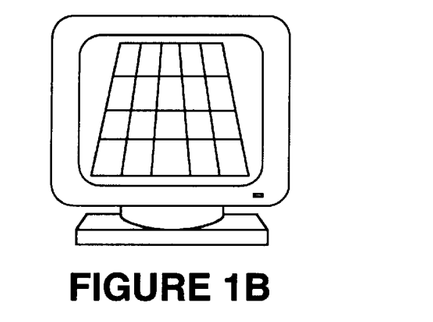
Figure 1C:
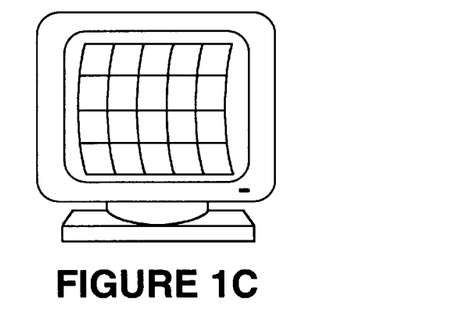
Figure 1D:
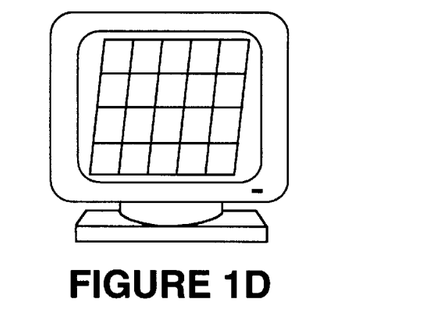
Figure 2:
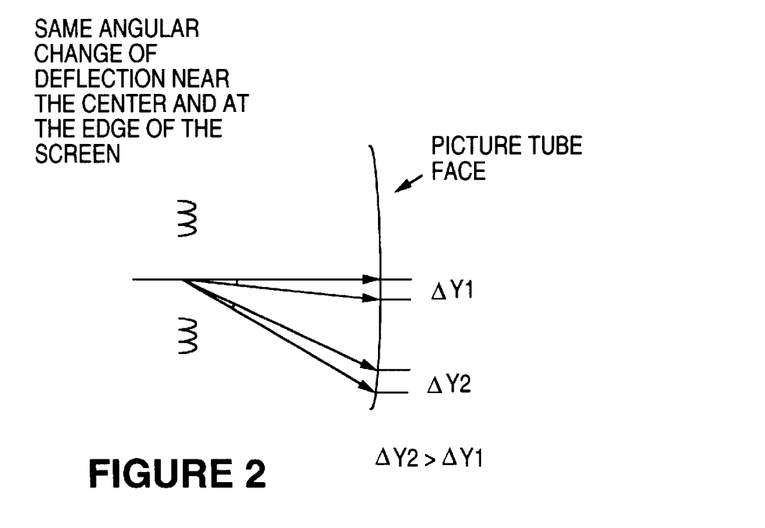
FIG. 2 illustrates electron beam deflection at different angles of deflection in a CRT display.

Referring to FIGS. 1A–1D, examples of some common raster distortions include: east-west pincushion (FIG. 1A); trapezoidal (FIG. 1B); east-west pincushion unbalance, or bow (FIG. 1C); and asymmetrical trapezoidal, or parallelogram (FIG. 1D). Pincushion distortion results primarily from the fact that in a cathode ray tube (CRT) the traveling distance of the electron beam from the electron gun to the picture tube screen is longer at the four corners than for the center region of the screen. Hence, for a given angular change in deflection, the electron beam is moved a greater distance across the screen at the corners than in the center region, as represented in FIG. 2.

Figure 3A:
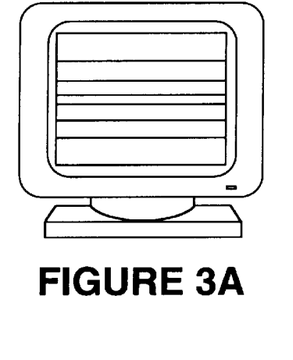
FIGS. 3A and 3B illustrate CRT rasters with vertical deflection controlled by linear and S-shaped sawtooth signals, respectively.
Figure 3B:
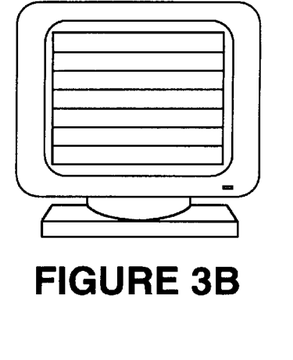
Figure 4:
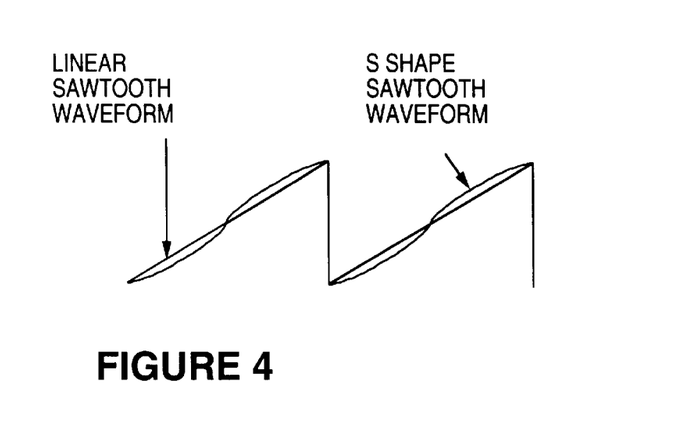
FIG. 4 illustrates an S-shaped sawtooth signal superimposed over a linear sawtooth signal for controlling vertical deflection.

Other asymmetries are often introduced due to the quality and/or alignment of the deflection yoke on the neck of the CRT. Referring to FIGS. 3A and 3B, distortion along the vertical dimension is also common. While north-south pincushion distortion is generally corrected by a self-converging deflection yoke (designed for converging the three electron beams from the R,G and B electron guns to the same color dot triplet) vertical deflection is nonetheless often distorted due to the aforementioned increase in electron beam deflection at the outer regions of the display. However, such vertical deflection distortion, the effect of which is image elongation near the top and bottom edges of the raster, can be corrected by introducing some "S" shaping to the otherwise linear sawtooth signal which controls the vertical deflection. Hence, as shown in FIG. 4, by shaping the ramp portion of the sawtooth vertical deflection control signal to resemble an "S" rather than a straight line, the distorted raster of FIG. 3A can be corrected to appear as the raster shown in FIG. 3B.

Figure 5:
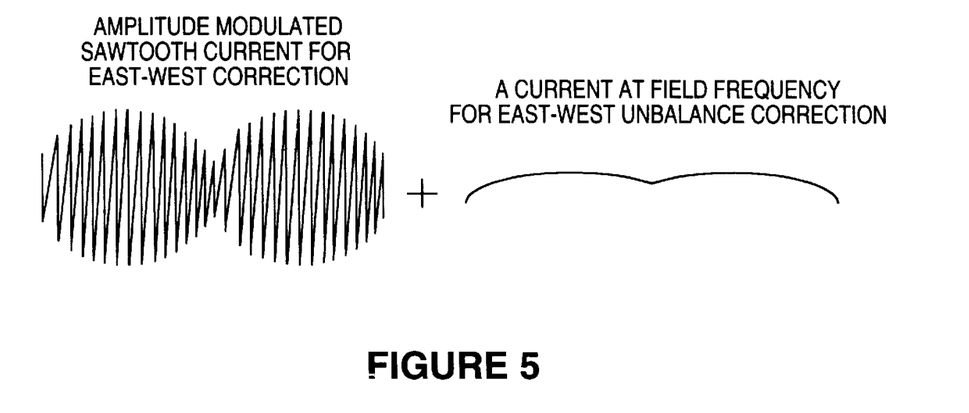
FIG. 5 illustrates an amplitude modulated sawtooth signal and a vertical field frequency signal to be summed for correcting east-west raster distortions.

Referring to FIG. 5, similar correction of east-west distortions can be made by amplitude modulating the envelope of the sawtooth signal which controls horizontal deflection, as well as adding a signal component at the vertical field frequency for correcting east-west unbalance distortions.

Conventional vertical and horizontal scanning control systems used to correct such vertical and horizontal distortions, have, to various degrees, suffered from a number of problems. For example, the signal used to generate the "S-curve" shaping for the vertical linearity correction should be a waveform having a parabolic shape, or an approximation thereof. One technique for achieving such a shape has been to approximate a parabolic curve by performing a full-wave rectification of the sawtooth vertical scanning signal. However, full-wave rectification is not perfectly symmetrical. While the typical symmetry of the rectified signal may be adequate for smaller displays, larger displays, particularly those with flatter screens, require much greater precision and symmetry to avoid non-linear scan lines at the outermost areas of the raster. Furthermore, for displays having flat screens, the second order nature of a parabolic signal is insufficient for providing adequate correction at the very top and bottom of the raster.

Another problem experienced by conventional displays involves horizontal correction for very large displays having flat screens. As noted above for the case of vertical correction, the second order nature of a parabolic waveform is insufficient for providing adequate horizontal correction for large displays with flat screens. Additionally, even if adequate vertical and horizontal correction can be achieved, adjustment of the vertical positioning of the raster within the display area causes the vertical center of the raster to change, thereby affecting the position at which maximum horizontal correction is applied, and thereby making such correction non-symmetrical along the sides of the raster.

Accordingly, it would be desirable to have a vertical and horizontal scanning control system for large video displays with flat screens which avoids or otherwise compensates for the foregoing problems associated with present conventional systems.

SUMMARY OF THE INVENTION

In accordance with one embodiment of the present invention, a vertical and horizontal scanning correction system for generating vertical and horizontal scanning correction signals for an image display device which displays therewith an image having consistent vertical and horizontal image dimensions regardless of the vertical positioning thereof includes a vertical ramp generator and scanning correction circuit and a horizontal scanning correction circuit. The vertical ramp generator and scanning correction circuit is configured to generate a vertical ramp and scanning correction signal for combining with a vertical position control signal and in accordance therewith generating a vertical ramp, correction and control signal having an adjustable dc vertical signal component. The vertical ramp and scanning correction signal is for an image display device which displays therewith an image having vertical and horizontal dimensions and positions associated therewith, and the vertical ramp and scanning correction signal corrects the vertical dimension and the adjustable dc vertical signal component controls the vertical position of the image displayed by such image display device. The horizontal scanning correction circuit is coupled to the vertical ramp generator and scanning correction circuit and is configured to receive the vertical ramp and scanning correction signal and the vertical position control signal and in accordance therewith generate a horizontal scanning correction signal. The horizontal scanning correction signal corrects the horizontal dimension and controls maintaining of the horizontal dimension of the image displayed by the image display device regardless of the vertical position thereof.

In accordance with another embodiment of the present invention, a horizontal scanning correction circuit for generating a horizontal scanning correction signal for an image display device which displays therewith an image having a geometrically correct horizontal image dimension includes a signal rectifier, a second order signal generator, a fourth order signal generator and a signal scaler and combiner. The signal rectifier is configured to receive and rectify a vertical ramp and scanning correction signal and in accordance therewith provide a rectified signal. The second order signal generator is coupled to the signal rectifier and is configured to receive and multiply the rectified signal and in accordance therewith provide a second order signal which represents a second order product of such rectified signal. The fourth order signal generator is coupled to the signal rectifier and is configured to receive and multiply the rectified signal and in accordance therewith provide a fourth order signal which represents a fourth order product of the rectified signal. The signal scaler and combiner is coupled to the signal rectifier, the second order signal generator and the fourth order signal generator and is configured to receive a plurality of scaling control signals and in accordance therewith receive, scale and combine the vertical scanning correction signal, the second order signal and the fourth order signal and in accordance therewith provide a horizontal scanning correction signal for an image display device which displays therewith an image having a geometrically correct horizontal image dimension.

In accordance with still another embodiment of the present invention, a signal converter for generating third order signal components based upon the first order components of an input signal includes first and second signal multipliers. The first signal multiplier is configured to receive complementary first and second current ramp signals corresponding to a voltage ramp signal and a complement thereof, respectively, and in accordance therewith provide a first current product signal which includes a second order current signal component representing a second order product of such voltage ramp signal. The second signal multiplier is coupled to the first signal multiplier and is configured to receive a portion of the first current product signal and the voltage ramp signal and in accordance therewith provide a second current product signal which includes a third order current signal component representing a third order product of the voltage ramp signal.

These and other features and advantages of the present invention will be understood upon consideration of the following detailed description of the invention and the accompanying drawings.

DETAILED DESCRIPTION OF THE INVENTION

Figure 6:
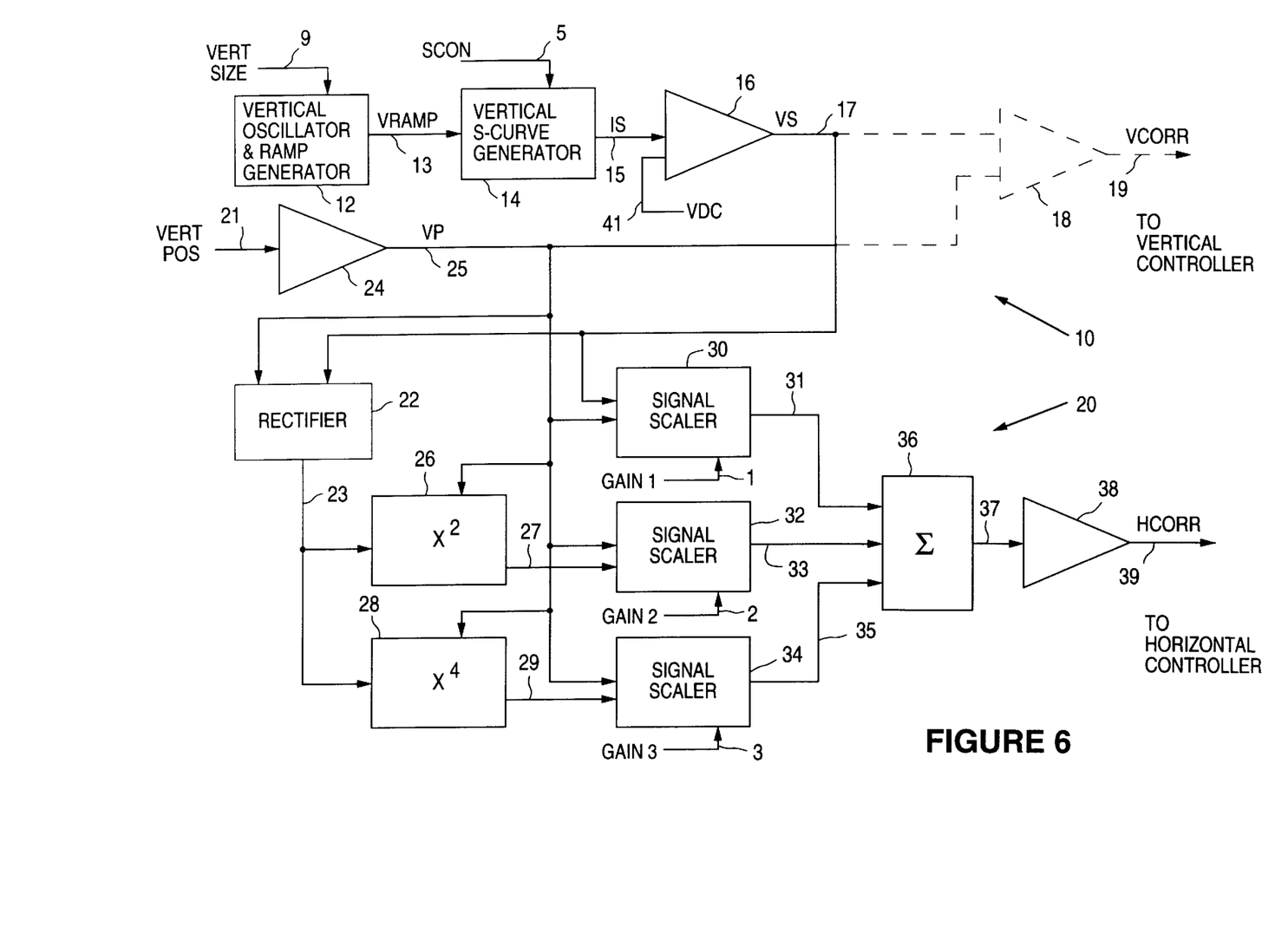
FIG. 6 is a functional block diagram of a vertical and horizontal scanning correction system in accordance with one embodiment of the present invention.

Referring to FIG. 6, a vertical and horizontal scanning correction system in accordance with one embodiment of the present invention can be implemented in a single integrated circuit die and includes a vertical scanning correction section 10 and a horizontal scanning correction section 20. The vertical section includes a vertical oscillator and ramp generator 12, a vertical S-curve generator 14, a current-to-voltage converter 16 and a buffer amplifier 24, interconnected substantially as shown. The horizontal section includes a rectifier 22, an $X^2$ signal generator 26, an $X^4$ signal generator 28, three signal scaling circuits 30, 32, 34, a signal combiner 36 and an output buffer amplifier 38, interconnected substantially as shown.

The vertical oscillator and ramp generator 12 (synchronized, e.g., phase locked, by a vertical synchronization signal) generates a voltage ramp signal 13. The amplitude of this ramp signal 13 is controlled by a vertical size signal 9 corresponding to the vertical size of the raster. The vertical S-curve generator 14, in accordance with a user control signal SCON 5, generates an S-curve current signal IS 15 which corresponds to the input ramp signal 13, but with the necessary arcuate signal shaping needed for the desired vertical correction (discussed in more detail below). This S-curve current signal 15 is converted to a corresponding S-curve voltage signal VS 17 by the current-to-voltage converter 16, with its DC signal component established in accordance with a DC reference voltage 41.

The buffer amplifier 24 receives and buffers a DC vertical position signal 21 corresponding to the vertical position of the raster. In addition to its use in the horizontal section 20 (discussed below), the resulting buffered DC vertical position signal VP 25 is also for combining with the S-curve voltage signal 17 in a vertical position control amplifier 18. The resulting vertical scanning correction signal 19 is sent to the vertical controller for correcting the vertical scanning of the display, with its AC component (peak-to-peak amplitude) determining the vertical size of the raster and its DC component determining the vertical position of the raster.

The S-curve signal 17 is received and full-wave rectified by the rectifier 22 in accordance with the buffered DC vertical position signal 25 which establishes the DC crossover level for the full-wave rectification. The $X^2$ circuit 26 multiplies the rectified signal 23 in accordance with the buffered DC vertical position signal 25, as does the $X^4$ circuit 28.

The S-curve signal 17, the second order product signal 27 (second order product of the rectified signal 23) and the fourth order product signal 29 (fourth order product of the rectified signal 23) are scaled in their respective signal scalers 30, 32, 34 in accordance with separate gain control signals 1, 2, 3 (discussed in more detail below). Accordingly, the respective amplitudes of the scaled signals 31, 33, 35 determine the individual contributions of each toward the horizontal correction of the horizontal scanning signal. These scaled correction signals 31, 33, 35 are summed in the signal combiner 36 and the composite correction signal 37 is buffered by the output amplifier 38 to produce the horizontal scanning correction signal 39 for use by the horizontal controller.

In reference to the vertical scanning correction section 10, as discussed in more detail below, the output current signal 15 from the vertical S-curve generator 14 contains, in addition to a first order component representing the input voltage ramp signal 13, both the second order and third order components corresponding to such ramp signal 13. These higher order components, generated without the distortion (e.g., discontinuity) introduced by the conventional technique of full-wave rectification of the ramp signal 13, can be controlled by the user via the S-curve control signal 5 and provides for more accurate linearity correction as is required by larger and flatter display screens.

In reference to the horizontal scanning correction section 20, the S-curve signal 17 generated by the vertical section 10 is used in generating the horizontal scanning correction signal 39. This ensures that the horizontal scanning correction signal 39 is controlled by the same AC signal components which control the vertical scanning correction signal 19. Also, through the use of the $x^2$ 26 and $X^4$ 28 circuits, higher order (i.e., second order and fourth order) products 33, 35 of the rectified S-curve signal 23 are combined with the corresponding S-curve signal 31 to provide greater flexibility in corrections for horizontal scanning in larger and flatter displays.

Figure 7:
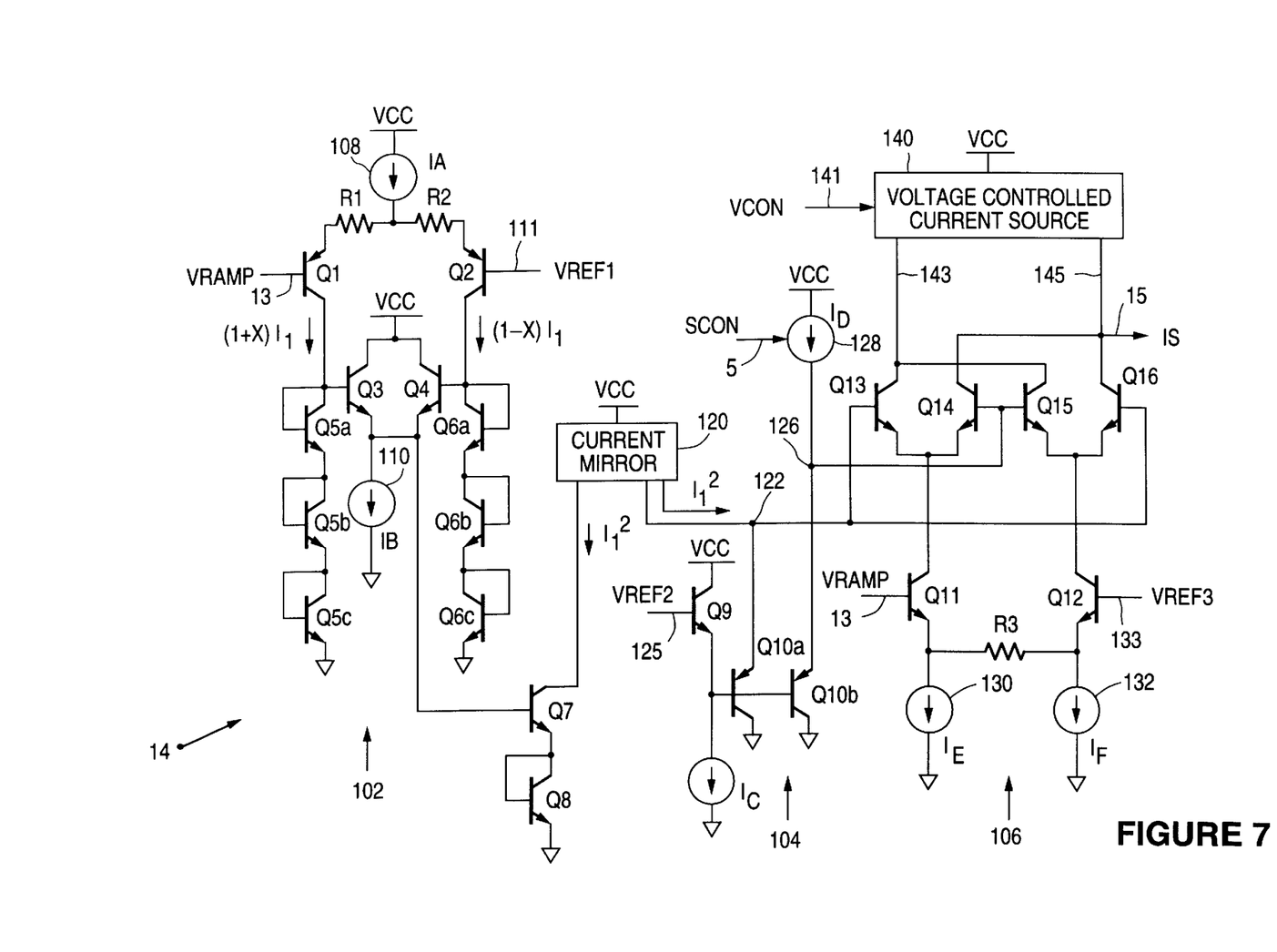
FIG. 7 is a schematic diagram of a preferred embodiment of the vertical S-curve generator of FIG. 6.

Referring to FIG. 7, a vertical S-curve generator 14 in accordance with one embodiment of the present invention is implemented as shown. This vertical S-curve generator 14 includes three stages: a voltage-to-second-order-current converter 102; a voltage clamp 104; and a four quadrant Gilbert multiplier 106. A differential pair of PNP transistors Q1, Q2, along with their degeneration resistors $R_1$, $R_2$, form a voltage-to-current converter receiving a supply current $I_A$ and a DC reference voltage 111 and the voltage ramp signal 13 as input signals. As a result, the collector currents of transistors Q1 and Q2 form complementary ramp current signals $(1+X)I_1$ and $(1-X)I_1$, respectively. This differential current $(1+X)I_1$, $(1-X)I_1$ feeds the input to two overlapping translinear loops for current-to-current-squared (I-to-$I^2$) conversion. Transistors Q5a–c, Q3, Q7 and Q8 form the first translinear loop, while transistors Q6a–c, Q4, Q7 and Q8 form the second translinear loop. The differential amplifier formed by transistors Q3 and Q4 is biased by an emitter source current $I_B$ which is set at $2I_1$. Transistors Q5a–c, Q6a–c and Q8 are diode-connected with their respective base and collector terminals shorted. Preferably, all of these transistors (Q3–Q8) are equal in size. In accordance with well known circuit analysis techniques, it can be readily shown that the resulting output current, i.e., the collector current of transistor Q7, is a second order product $I_1^2$ corresponding to the differential input current $(1+X)I_1$, $(1-X)I_1$.

This second order current product $I_1^2$ is replicated by a current mirror 120 and fed into a node 122 which is clamped by the voltage clamp 104. The voltage clamp 104, due to the base-emitter voltages of PNP transistor Q9 and NPN transistors Q10a, Q10b and the reference voltage 125 applied at the base of transistor Q9, maintains controllable voltage potentials at the input nodes 122, 126 of the four quadrant Gilbert multiplier 106. The DC component of the voltage at node 122 equals the voltage clamp DC reference voltage 125, while the AC component corresponds to a parabola as determined by the emitter current ($I^2$) of transistor Q10a. Similarly, the DC component of the voltage at node 126 equals the voltage clamp reference voltage 125 plus or minus a relatively small voltage differential which is determined by the emitter current through transistor Q10b. Different values of emitter current produce different current densities within the emitter of transistor Q10b, thereby resulting in a voltage at node 126 which will differ by a controllable amount from the voltage clamp reference voltage 125. The amount by which the emitter current of transistor Q10b varies is controlled by the S-curve signal 5 which controls the current source 128 providing current $I_D$.

The four quadrant Gilbert multiplier 106 includes an upper quad formed by cross-connected differential amplifiers Q13/Q14, Q15/Q16, and a lower quad formed by a differential transistor pair Q11/Q12 connected by resistor $R_3$. The emitter of transistors Q11 and Q12 are biased by current sources 130, 132 which sink currents $I_E$ and $I_F$. The base of transistor Q12 is biased by a reference voltage 133, while the base of transistor Q11 is driven by the voltage ramp signal 13. The voltage clamped input nodes 122 and 126 of the upper quad are driven by a portion of the input current $I_1^2$ and a portion of the DC biasing current $I_D$. A voltage controlled current source 140, in accordance with a control signal 141, supplies collector currents 143, 145 to the transistors Q13, Q14, Q15, Q16 in the upper quad. As a result, the input current $I_1^2$, which corresponds to the original input ramp signal 13, is effectively multiplied once again by the input ramp signal 13 (via transistors Q11 and Q13–Q16). Accordingly, the output current signal 15 is a third order product of the original input voltage ramp signal 13, but in the form of an output current.

Figure 8:
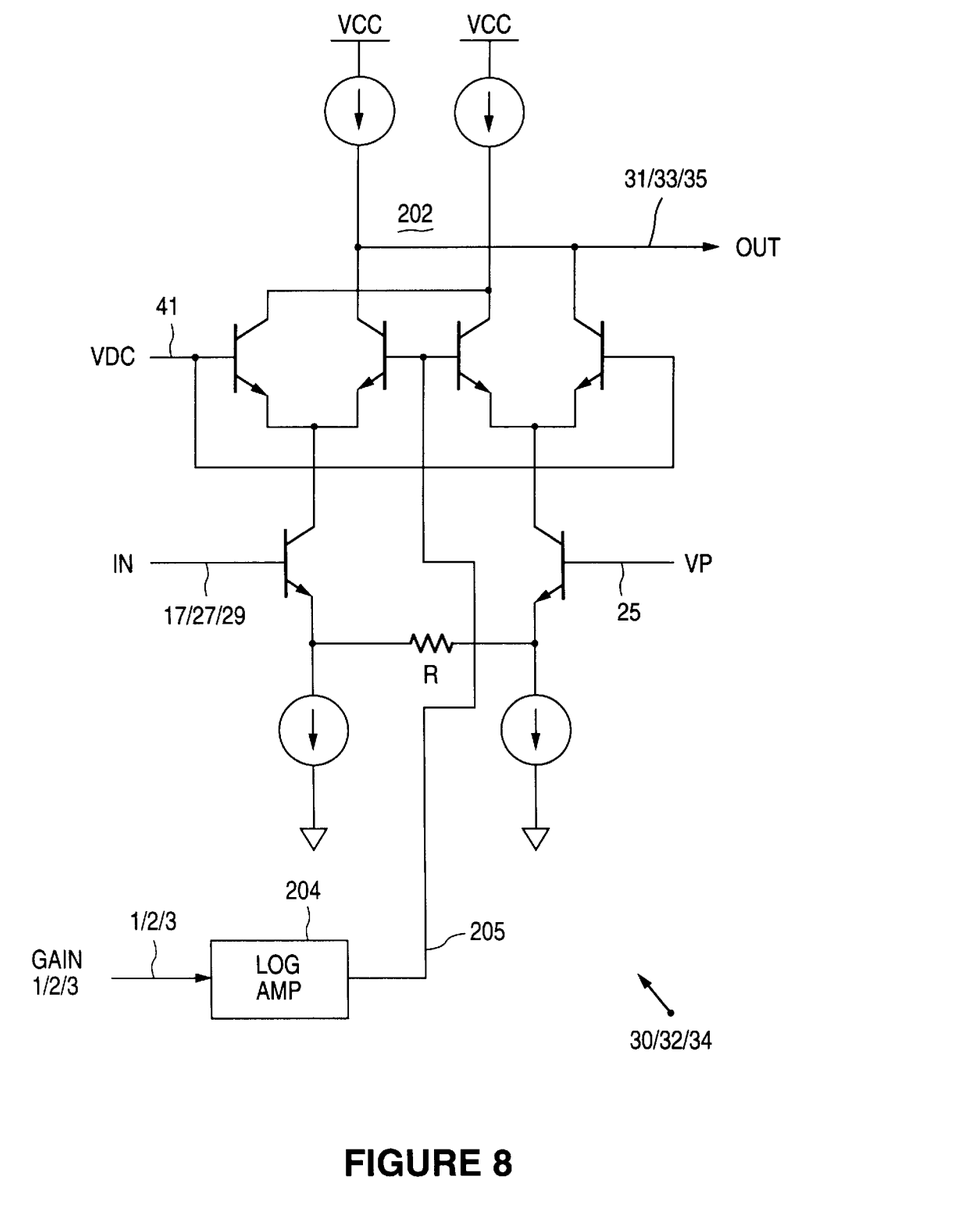
FIG. 8 is a schematic diagram of a preferred embodiment of the signal scalers of FIG. 6.

Referring to FIG. 8, each of the signal scalers, 30, 32, 34 of FIG. 6 can be implemented as a four quadrant Gilbert multiplier circuit 202 with a logarithmic amplifier 204 for processing the gain control signals 1, 2, 3. One side of the lower "quad" is biased by the buffered DC vertical position control signal 25, while the other side is driven by the input signal, i.e., the S-curve signal 17, the second order product signal 27 or fourth order product signal 29. In the upper "quad," one side of each branch is biased by the DC reference voltage 41, while the other side is driven by the logarithmic signal 205 generated by the logarithmic amplifier 204. This logarithmic signal 205 represents the logarithm of the input gain signal 1/2/3 and is maintained at a voltage value which is close but not equal to the DC reference voltage 41 (e.g., plus or minus 100 millivolts), thereby ensuring optimal operation of the Gilbert multiplier circuit 202.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a horizontal scanning correction circuit for generating a horizontal scanning correction signal for an image display device which displays therewith an image having a geometrically correct horizontal image dimension, said horizontal scanning correction circuit comprising:

a signal rectifier configured to receive and rectify a vertical ramp and scanning correction signal and in accordance therewith provide a rectified signal;

a second order signal generator, coupled to said signal rectifier, configured to receive and multiply said rectified signal and in accordance therewith provide a second order signal which represents a second order product of said rectified signal;

a fourth order signal generator, coupled to said signal rectifier, configured to receive and multiply said rectified signal and in accordance therewith provide a fourth order signal which represents a fourth order product of said rectified signal; and a signal scaler and combiner, coupled to said second order signal generator and said fourth order signal generator, configured to receive a plurality of scaling control signals and in accordance therewith receive, scale and combine said vertical ramp and scanning correction signal, said second order signal and said fourth order signal and in accordance therewith provide a horizontal scanning correction signal for an image display device which displays therewith an image having a geometrically correct horizontal image dimension.

2. The apparatus of claim 1, wherein said vertical ramp and scanning correction signal is for said image display device which displays therewith an image having a geometrically correct vertical image dimension.

3. The apparatus of claim 2, wherein said vertical ramp and scanning correction signal includes a third order signal component representing a third order product of a voltage ramp signal.

4. The apparatus of claim 1, wherein said signal rectifier comprises a full wave signal rectifier configured to receive and rectify said vertical ramp and scanning correction signal and in accordance therewith provide a full wave rectified signal as said rectified signal.

5. The apparatus of claim 1, wherein said signal scaler and combiner comprises:

a first signal weighting circuit configured to receive said vertical ramp and scanning correction signal and a first one of said plurality of scaling control signals and in accordance therewith provide a first correction signal which is proportional to said rectified signal;

a second signal weighting circuit, coupled to said second order signal generator, configured to receive said second order signal and a second one of said plurality of scaling control signals and in accordance therewith provide a second correction signal which is proportional to said second order signal;

a third signal weighting circuit, coupled to said fourth order signal generator, configured to receive said fourth order signal and a third one of said plurality of scaling control signals and in accordance therewith provide a third correction signal which is proportional to said fourth order signal; and a signal adder, coupled to said first, second and third signal weighting circuits, configured to receive and add said first, second and third correction signals and in accordance therewith provide said horizontal scanning correction signal.

6. An apparatus including a vertical and horizontal scanning correction system for generating vertical and horizontal scanning correction signals for an image display device which displays therewith an image having consistent vertical and horizontal image dimensions regardless of the vertical positioning thereof, said vertical and horizontal scanning correction system comprising:

a vertical ramp generator and scanning correction circuit configured to generate a vertical ramp and scanning correction signal for combining with a vertical position control signal and in accordance therewith generating a vertical ramp, correction and control signal having an adjustable dc vertical signal component, wherein said vertical ramp and scanning correction signal is for an image display device which displays therewith an image having vertical and horizontal dimensions and positions associated therewith, and wherein said vertical ramp and scanning correction signal corrects said vertical dimension and said adjustable dc vertical signal component controls said vertical position of said image displayed by said image display device, and further wherein said vertical ramp generator and scanning correction circuit comprises a multiplier circuit configured to receive, process and multiply a ramp signal and in accordance therewith provide said vertical ramp and scanning correction signal, and still further wherein said vertical ramp and scanning correction signal includes a third order current signal component representing a third order product of said voltage ramp signal, and yet still further wherein said ramp signal comprises complementary first and second current ramp signals corresponding to a voltage ramp signal and a complement thereof, respectively, and said multiplier circuit includes a first signal multiplier configured to receive said complementary first and second current ramp signals and in accordance therewith provide a first current product signal which includes a second order current signal component representing a second order product of said voltage ramp signal, a second signal multiplier, coupled to said first signal multiplier, configured to receive a first portion of said first current product signal and said voltage ramp signal and in accordance therewith provide a second current product signal which includes a third order current signal component representing a third order product of said voltage ramp signal, and a clamping circuit, coupled between said first and second signal multipliers, configured to receive said first portion of said first current product signal, a second portion of said first current product signal, a clamping voltage and a control signal and in accordance therewith provide, clamped at said clamping voltage, said first portion of said first current product signal and a portion of said control signal; and a horizontal scanning correction circuit, coupled to said vertical ramp generator and scanning correction circuit, configured to receive said vertical ramp and scanning correction signal and said vertical position control signal and in accordance therewith generate a horizontal scanning correction signal, wherein said horizontal scanning correction signal corrects said horizontal dimension and controls maintaining of said horizontal dimension of said image displayed by said image display device regardless of said vertical position thereof.

7. An apparatus including a vertical and horizontal scanning correction system for generating vertical and horizontal scanning correction signals for an image display device which displays therewith an image having consistent vertical and horizontal image dimensions regardless of the vertical positioning thereof, said vertical and horizontal scanning correction system comprising:

a vertical ramp generator and scanning correction circuit configured to generate a vertical ramp and scanning correction signal for combining with a vertical position control signal and in accordance therewith generating a vertical ramp, correction and control signal having an adjustable dc vertical signal component, wherein said vertical ramp and scanning correction signal is for an image display device which displays therewith an image having vertical and horizontal dimensions and positions associated therewith, and wherein said vertical ramp and scanning correction signal corrects said vertical dimension and said adjustable dc vertical signal component controls said vertical position of said image displayed by said image display device, and further wherein said vertical ramp generator and scanning correction circuit includes a multiplier circuit configured to receive, process and multiply a ramp signal and in accordance therewith provide said vertical ramp and scanning correction signal, and still further wherein said vertical ramp and scanning correction signal includes a third order current signal component representing a third order product of said voltage ramp signal; and a horizontal scanning correction circuit, coupled to said vertical ramp generator and scanning correction circuit, configured to receive said vertical ramp and scanning correction signal and said vertical position control signal and in accordance therewith generate a horizontal scanning correction signal, wherein said horizontal scanning correction signal corrects said horizontal dimension and controls maintaining of said horizontal dimension of said image displayed by said image display device regardless of said vertical position thereof, and wherein said horizontal scanning correction circuit includes a signal rectifier configured to receive said vertical position control signal and in accordance therewith receive and rectify said vertical ramp and scanning correction signal and in accordance therewith provide a rectified signal, a second order signal generator, coupled to said signal rectifier, configured to receive said vertical position control signal and in accordance therewith receive and multiply said rectified signal and in accordance therewith provide a second order signal which represents a second order product of said rectified signal, a fourth order signal generator, coupled to said signal rectifier, configured to receive said vertical position control signal and in accordance therewith receive and multiply said rectified signal and in accordance therewith provide a fourth order signal which represents a fourth order product of said rectified signal, and a signal scaler and combiner, coupled to said signal rectifier, said second order signal generator and said fourth order signal generator, configured to receive a plurality of scaling control signals and in accordance therewith receive, scale and combine said vertical ramp and scanning correction signal, said second order signal and said fourth order signal and in accordance therewith provide said horizontal scanning correction signal.

8. An apparatus including a vertical and horizontal scanning correction system for generating vertical and horizontal scanning correction signals for an image display device which displays therewith an image having consistent vertical and horizontal image dimensions regardless of the vertical positioning thereof, said vertical and horizontal scanning correction system comprising:

a vertical ramp generator and scanning correction circuit configured to generate a vertical ramp and scanning correction signal for combining with a vertical position control signal and in accordance therewith generating a vertical ramp, correction and control signal having an adjustable dc vertical signal component, wherein said vertical ramp and scanning correction signal is for an image display device which displays therewith an image having vertical and horizontal dimensions and positions associated therewith, and wherein said vertical ramp and scanning correction signal corrects said vertical dimension and said adjustable dc vertical signal component controls said vertical position of said image displayed by said image display device; and a horizontal scanning correction circuit, coupled to said vertical ramp generator and scanning correction circuit, configured to receive said vertical ramp and scanning correction signal and said vertical position control signal and in accordance therewith generate a horizontal scanning correction signal, wherein said horizontal scanning correction signal corrects said horizontal dimension and controls maintaining of said horizontal dimension of said image displayed by said image display device regardless of said vertical position thereof, and wherein said horizontal scanning correction circuit includes a signal rectifier configured to receive said vertical position control signal and in accordance therewith receive and rectify said vertical ramp and scanning correction signal and in accordance therewith provide a rectified signal, a second order signal generator, coupled to said signal rectifier, configured to receive said vertical position control signal and in accordance therewith receive and multiply said rectified signal and in accordance therewith provide a second order signal which represents a second order product of said rectified signal, a fourth order signal generator, coupled to said signal rectifier, configured to receive said vertical position control signal and in accordance therewith receive and multiply said rectified signal and in accordance therewith provide a fourth order signal which represents a fourth order product of said rectified signal, and a signal scaler and combiner, coupled to said signal rectifier, said second order signal generator and said fourth order signal generator, configured to receive a plurality of scaling control signals and in accordance therewith receive, scale and combine said vertical ramp and scanning correction signal, said second order signal and said fourth order signal and in accordance therewith provide said horizontal scanning correction signal.

9. An apparatus including a signal converter for generating third order signal components based upon the first order components of an input signal, said signal converter comprising:

a first signal multiplier configured to receive complementary first and second current ramp signals corresponding to a voltage ramp signal and a complement thereof, respectively, and in accordance therewith provide a first current product signal which includes a second order current signal component representing a second order product of said voltage ramp signal, wherein said first signal multiplier includes first and second power supply nodes, a first translinear current loop circuit, coupled between said first and second power supply nodes, configured to receive said first current ramp signal, and a second translinear current loop circuit, coupled between said first and second power supply nodes, configured to receive said second current ramp signal, and wherein said first and second translinear current loop circuits comprise and share a plurality of circuit elements which together form a plurality of subcircuits including a differential amplifier configured to receive first and second portions of said first and second current ramp signals, respectively, and in accordance therewith provide a tail current, and a tail circuit, coupled to said differential amplifier, configured to receive said tail current and in accordance therewith provide said first current product signal, wherein said first current product signal represents a product of said first and second current ramp signals; and a second signal multiplier, coupled to said first signal multiplier, configured to receive a first portion of said first current product signal and said voltage ramp signal and in accordance therewith provide a second current product signal which includes a third order current signal component representing a third order product of said voltage ramp signal.

10. The apparatus of claim 3, wherein said first and second translinear current loop circuits comprise first and second pluralities of diode-connected transistors in first and second totem-pole configurations configured to receive third and fourth portions of said first and second current ramp signals, respectively.

11. An apparatus including a signal converter for generating third order signal components based upon the first order components of an input signal, said signal converter comprising:

a first signal multiplier configured to receive complementary first and second current ramp signals corresponding to a voltage ramp signal and a complement thereof, respectively, and in accordance therewith provide a first current product signal which includes a second order current signal component representing a second order product of said voltage ramp signal; and a second signal multiplier, coupled to said first signal multiplier, configured to receive a first portion of said first current product signal and said voltage ramp signal and in accordance therewith provide a second current product signal which includes a third order current signal component representing a third order product of said voltage ramp signal, wherein said second signal multiplier includes a four quadrant multiplier circuit.

12. The apparatus of claim 11, wherein said four quadrant multiplier circuit comprises:

a pair of cross coupled differential amplifiers configured to receive said first portion of said first current product signal and a reference current and provide said second current product signal; and a pair of resistively coupled transistors, coupled to said pair of cross coupled differential amplifiers, configured to receive said voltage ramp signal and a reference voltage;

wherein said second current product signal represents a product of said first and second current ramp signals and said voltage ramp signal.

13. An apparatus including a signal converter for generating third order signal components based upon the first order components of an input signal, said signal converter comprising:

a first signal multiplier configured to receive complementary first and second current ramp signals corresponding to a voltage ramp signal and a complement thereof, respectively, and in accordance therewith provide a first current product signal which includes a second order current signal component representing a second order product of said voltage ramp signal;

a second signal multiplier, coupled to said first signal multiplier, configured to receive a first portion of said first current product signal and said voltage ramp signal and in accordance therewith provide a second current product signal which includes a third order current signal component representing a third order product of said voltage ramp signal; and a voltage-to-current converter, coupled to said first signal multiplier, configured to receive said voltage ramp signal and in accordance therewith provide said complementary first and second current ramp signals.

14. The apparatus of claim 13, wherein said voltage-to-current converter comprises a differential amplifier configured to receive a source current, said voltage ramp signal and a reference voltage and in accordance therewith provide said complementary first and second current ramp signals.

15. An apparatus including a signal converter for generating third order signal components based upon the first order components of an input signal, said signal converter comprising:

a first signal multiplier configured to receive complementary first and second current ramp signals corresponding to a voltage ramp signal and a complement thereof, respectively, and in accordance therewith provide a first current product signal which includes a second order current signal component representing a second order product of said voltage ramp signal;

a second signal multiplier, coupled to said first signal multiplier, configured to receive a first portion of said first current product signal and said voltage ramp signal and in accordance therewith provide a second current product signal which includes a third order current signal component representing a third order product of said voltage ramp signal; and a clamping circuit, coupled between said first and second signal multipliers, configured to receive said first portion of said first current product signal, a second portion of said first current product signal, a clamping voltage and a control signal and in accordance therewith provide, clamped at said clamping voltage, said first portion of said first current product signal and a portion of said control signal.

* * * * *

UNITED STATES PATENT AND TRADEMARK OFFICE
CERTIFICATE OF CORRECTION

PATENT NO.: 5,877,599
DATED: March 2, 1999
INVENTOR(S): Peyman Hojabri

It is certified that an error appears in the above-identified patent and that said Letters Patent is hereby corrected as shown below:

In Col. 11, line 22, delete "3" and replace with --9--.

Signed and Sealed this

Sixth Day of July, 1999

Q. TODD DICKINSON

Attest:

Attesting Officer

Acting Commissioner of Patents and Trademarks